US007012880B2

(12) United States Patent
Kim et al.

(10) Patent No.: US 7,012,880 B2
(45) Date of Patent: Mar. 14, 2006

(54) HIGH DENSITY DISK RECORDING MEDIUM AND APPARATUS USING THE SAME

(75) Inventors: Jin Yong Kim, Sungnam-si (KR); Kyung Chan Park, Seoul (KR)

(73) Assignee: LG Electronics Inc., Seoul (KR)

( * ) Notice: Subject to any disclaimer, the term of this patent is extended or adjusted under 35 U.S.C. 154(b) by 252 days.

(21) Appl. No.: 10/097,547

(22) Filed: Mar. 5, 2002

(65) Prior Publication Data

US 2002/0167892 A1    Nov. 14, 2002

(30) Foreign Application Priority Data

May 14, 2001    (KR)    ............................... 2001-26250

(51) Int. Cl.
*G11B 3/70*    (2006.01)

(52) U.S. Cl. ..................................................... 369/280
(58) Field of Classification Search ................ 369/280, 369/272.1, 282, 289.1, 290.1, 292
See application file for complete search history.

(56) References Cited

U.S. PATENT DOCUMENTS 5,301,183 A * 4/1994 Minoda et al. ............. 369/280
5,448,547 A * 9/1995 Minoda et al. ............. 369/280
5,999,513 A   12/1999 Arakawa et al.
6,214,430 B1 * 4/2001 Kim et al. .................. 428/64.1
6,747,943 B1 * 6/2004 Netsu et al. ................ 369/282

FOREIGN PATENT DOCUMENTS

EP    0 554 885 A2    8/1993
JP    10269620    10/1998

* cited by examiner

Primary Examiner—Angel Castro
(74) Attorney, Agent, or Firm—Lee, Hong, Degerman, Kang & Schmadeka, P.C.

(57) ABSTRACT

The present invention relates to a high-density disk that is structured to prevent a collision of an optical pickup's objective lens with the high-density disk if the disk is placed upside down in a disk device that is able to record and reproduce signals to/from the high-density disk. A high-density disk recording medium according to the present invention is structured such that, wherein a recording layer having high-density pit patterns is offset from a center plane of disk thickness, both sides of a clamping zone bisected by the center plane have differing thicknesses. One or both sides may protrude from surface of the disk recording medium, or one side of the clamping zone may protrude from the surface while the other side is indented below the surface.

28 Claims, 9 Drawing Sheets

*For Case of Normal Placement*

*For Case of Misplacement*

*For Case of Normal Placement*

*For Case of Misplacement*

For Case of Normal Placement

*For Case of Misplacement*

HIGH DENSITY DISK RECORDING MEDIUM AND APPARATUS USING THE SAME

CROSS REFERENCE TO RELATED ART

This application claims the benefit of Korean Patent Application No. 2001-26250, filed on May 14, 2001, which is hereby incorporated by reference in its entirety.

BACKGROUND OF THE INVENTION

1. Field of the Invention

The present invention relates to a high-density disk structure preventing collision of an optical pickup's objective lens with a high-density disk which is placed upside down in a disk device being able to reproduce and record signals from/to a high-density disk such as a high-density digital versatile disk (called "HD-DVD" hereinafter).

2. Description of the Related Art

A compact disk, usually called "CD," is 1.2 mm in thickness and 120 mm in diameter as shown in FIG. 1. A CD has a center hole of 15 mm diameter and a clamping zone of 44 mm, which encircles the center hole where the clamping zone is clamped by a damper on a spindle or a turntable installed in a disk device.

When a CD is normally placed into a disk device, its recording layer, which has pit patterns, is approximately 1.2 mm from an objective lens of an optical pickup equipped in the disk device. The objective lens for a CD has a numerical aperture (NA) of 0.45, which is relatively small.

A digital versatile disk, usually called "DVD," is 1.2 mm in thickness and 120 mm in diameter like a CD as shown in FIG. 2. A DVD also has a center hole of 15 mm diameter and a clamping zone of 44 mm encircling the center hole.

When a DVD is normally placed into a disk device, its recording layer, which has pit patterns, is approximately 0.6 mm from an objective lens of an optical pickup equipped in the disk device. The objective lens for a DVD has a NA of 0.6, which is relatively large.

A HD-DVD, which is currently being commercialized, is 1.2 mm in thickness and 120 mm in diameter, like a CD as shown in FIG. 3. A HD-DVD also has a center hole of 15 mm diameter and a clamping zone of 44 mm encircling the center hole. If a HD-DVD is normally placed into a disk device, there will be a 0.1 mm gap between its recording layer, which also has pit patterns, and an objective lens of an optical pickup for a HD-DVD, which has the largest NA of 0.85. The optical pickup for a HD-DVD uses a laser beam of shorter wavelength than for a CD or a DVD to record or reproduce signals in high density.

Therefore, in comparison with a CD or a DVD, HD-DVD uses an objective lens that is situated closer to the recording layer, that uses a laser beam of shorter wavelength, and that has a greater NA. According to these conditions, it is possible to concentrate a stronger intensity of light on a smaller beam spot formed on the high-density pit patterns of the recording layer of the HD-DVD. Consequently, the transmitting distance of a laser beam of shorter wavelength is shortened, and the variation of the laser beam and its spherical aberration are minimized.

If a HD-DVD 10 is normally placed onto a turntable 11 installed in a disk device as shown in FIG. 4, a conventional servo-controlling operation for a spindle motor 12 by a motor driving unit 13 and a servo controller 15 is conducted to rotate the placed HD-DVD 10 at a constant and high speed. While the HD-DVD 10 is rotating, a focusing-servo operation is conducted to focus a laser beam for an optical pickup 14 exactly onto the recording layer 9. This operation is performed by moving the objective lens OL of the optical pickup 14 in an up and down direction within an operating distance OD. If a laser beam is exactly in focus, then reproduction (or recording) of high-density pit patterns can be accomplished.

However, when the HD-DVD 10 is misplaced onto the turntable 11 by, for example, being placed upside down as shown in FIG. 5, the HD-DVD 10 will still be rotated at a constant and high speed by the combined servo-controlling operation by the spindle motor 12, the motor driving unit 13, and the servo controller 15. However, if the HD-DVD 10 has been placed upside down, the gap between the recording layer 9 and the objective lens OL of the optical pickup 14 is 1.1 mm greater in comparison with a normally-placed HD-DVD.

In this misplacement, a laser beam cannot be focused within the conventional operating distance of the objective lens OL of the pickup 14. Therefore, the servo controller 15 supervising the focusing-servo operation continues to move the objective lens OL upward to the maximum movable distance 'OD_Max' until the laser beam is correctly focused. However, in this case, the objective lens OL will collide with the misplaced HD-DVD 10. Consequently, the HD-DVD 10, the objective lens OL, and/or the servo-mechanism would be irreparably damaged.

SUMMARY OF THE INVENTION

It is an object of the present invention to provide a high-density disk structured to prevent the collision of an objective lens of an optical pickup and the high-density disk even though the objective lens moves upward to maximum movable distance, and to enable the detection of the misplacement of a high-density disk as no disk state through a conventional focusing operation on the condition that the high-density disk has been placed upside down.

Additional features and advantages of the invention will be set forth in the description which follows, and in part will be apparent from the description, or may be learned by practice of the invention. The objectives and other advantages of the invention will be realized and attained by the structure particularly pointed out in the written description and claims hereof as well as the appended drawings.

To achieve these and other advantages and in accordance with the purpose of the present invention, as embodied and broadly described, a recording medium for storing data comprises a disk having first and second surfaces, the disk including a recording area and a clamping area and defining a center hole for receiving a spindle therein, wherein the clamping area includes corresponding first and second clamping surfaces; a recording layer coplanarly disposed in the disk, wherein the recording layer is in closer proximity to the second surface of the disk; and the clamping area at least partially having a protruding portion on the first clamping surface so that the disk is raised from the spindle when the disk is inserted by placing the first clamping surface on the spindle.

According to one aspect of the present invention, the clamping area at the protruding portion has first and second thicknesses measured from a center plane of the disk, the first thickness measured in a direction extending from the center plane of the disk toward the first surface of the disk and the second thickness measured in a direction toward the second surface, wherein the first thickness is greater than the second thickness. Preferably, the difference between the first and the second thicknesses is approximately 0.1 mm to 0.6 mm.

According to another aspect of the present invention, the second clamping surface is coplanar with the second surface of the disk.

According to another aspect of the present invention, the clamping area at least partially has a protruding portion on the second clamping surface.

According to another aspect of the present invention, the second clamping surface is at an uneven level with respect to the second surface of the disk.

It is to be understood that both the foregoing general description and the following detailed description are exemplary and explanatory and are intended to provide a further explanation of the invention as claimed.

BRIEF DESCRIPTION OF THE DRAWINGS

The accompanying drawings, which are included to provide a further understanding of the invention, illustrate the preferred embodiments of the invention, and together with the description, serve to explain the principles of the present invention.

DETAILED DESCRIPTION OF THE PREFERRED EMBODIMENTS

In order that the invention may be fully understood, a preferred embodiment thereof will now be described with reference to the accompanying drawings.

Figure 1:
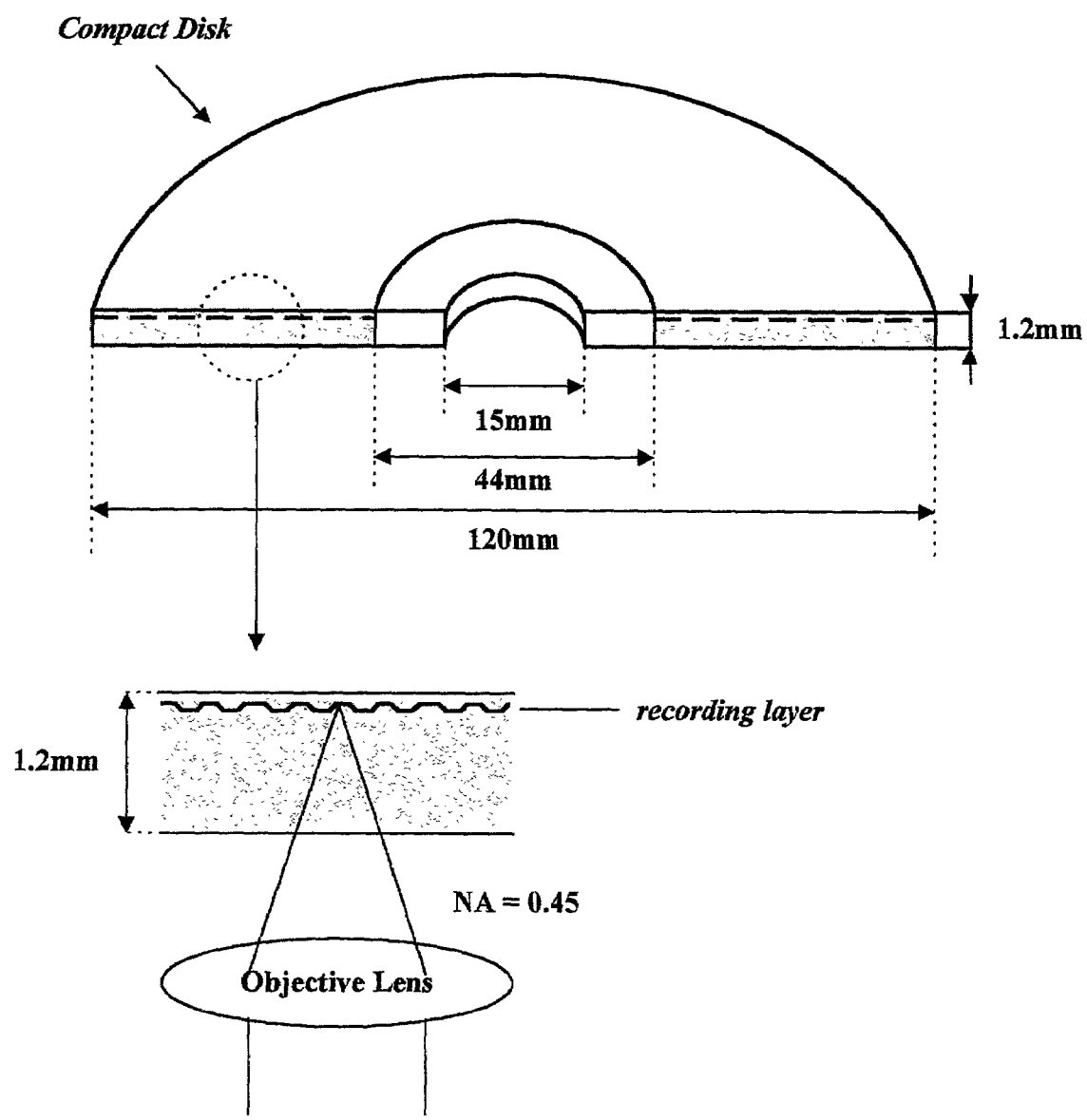
FIG. 1 shows the structure of a conventional compact disk (CD)
Figure 2:
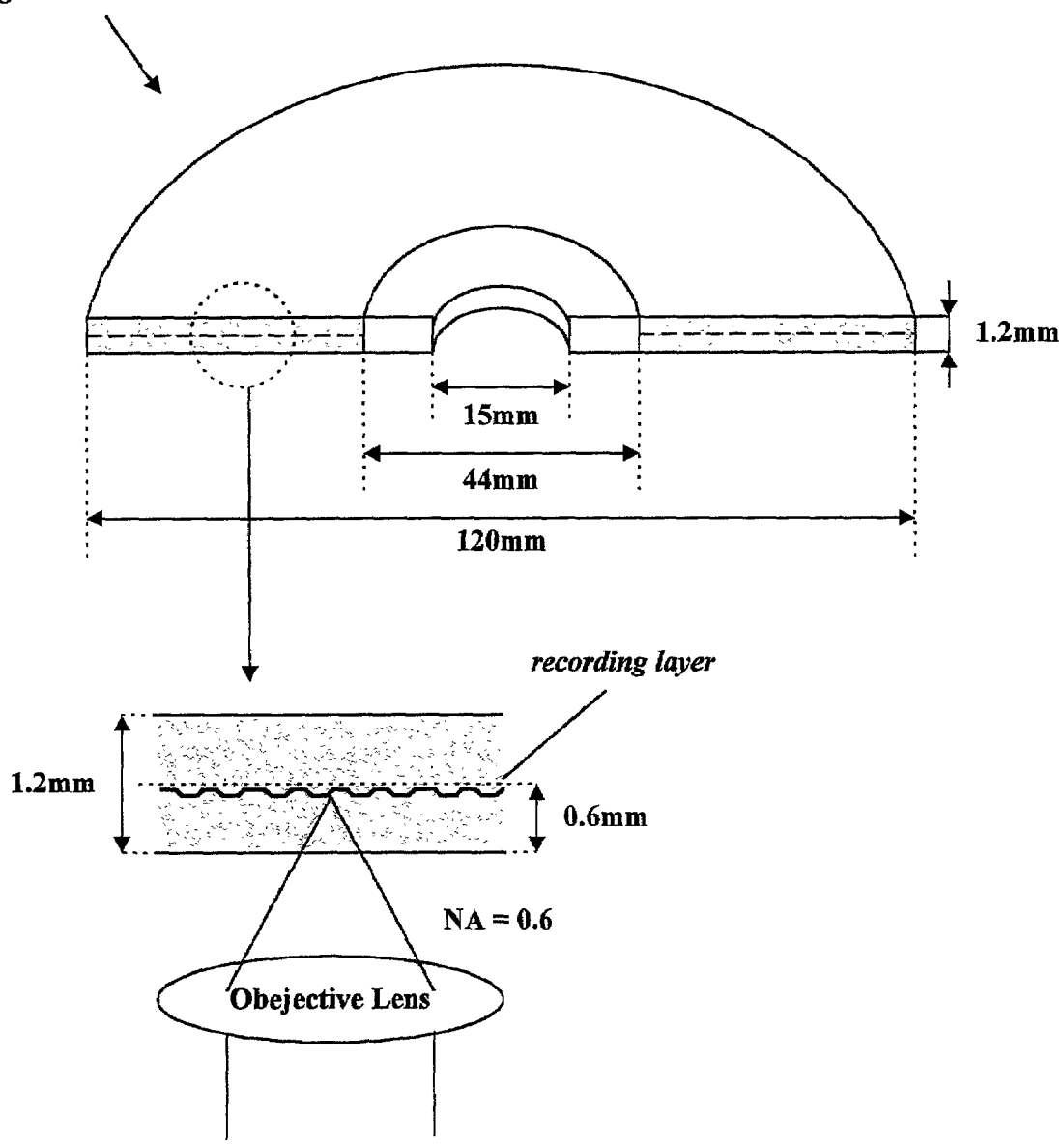
FIG. 2 shows the structure of a conventional digital versatile disk (DVD)
Figure 3:
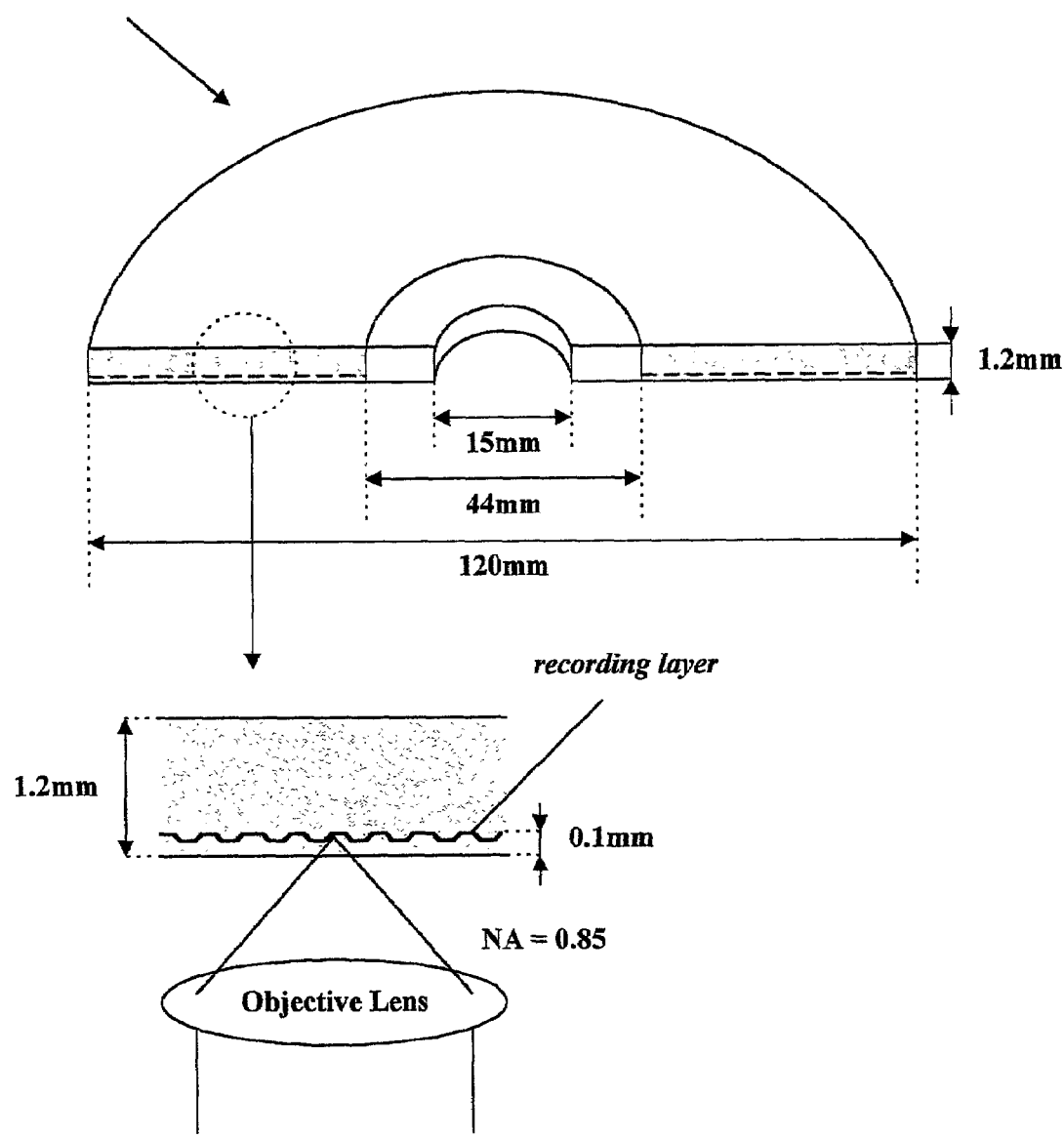
FIG. 3 shows the structure of a conventional high-density DVD (HD-DVD)
Figure 4:
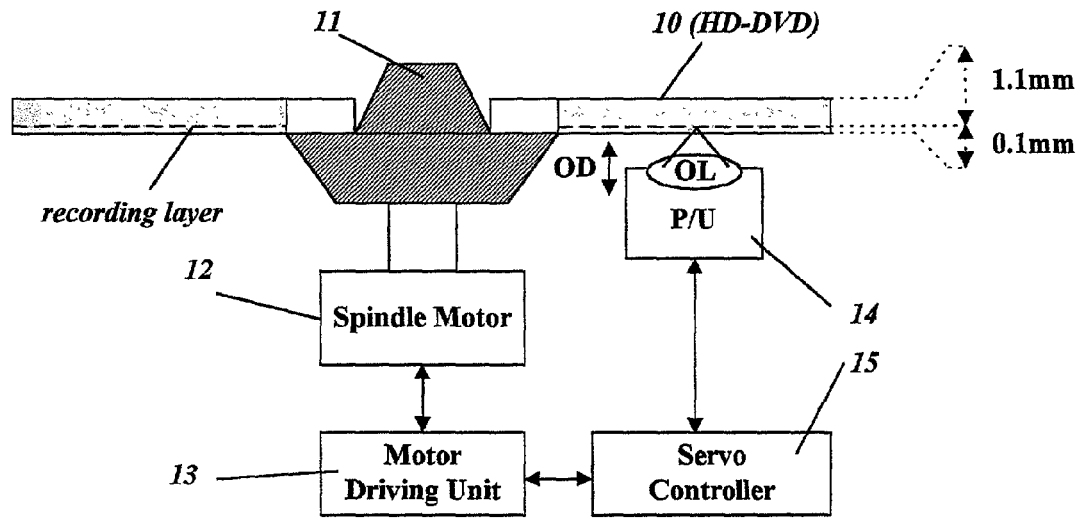
FIGS. 4 and 5 show normal placement and misplacement of a conventional high-density DVD, respectively.
Figure 5:
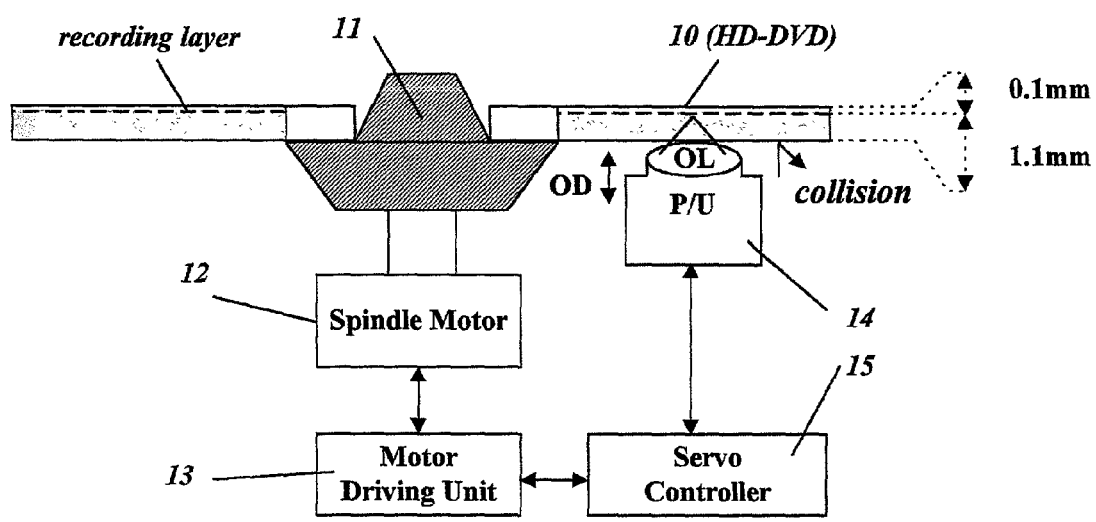
Figure 6:
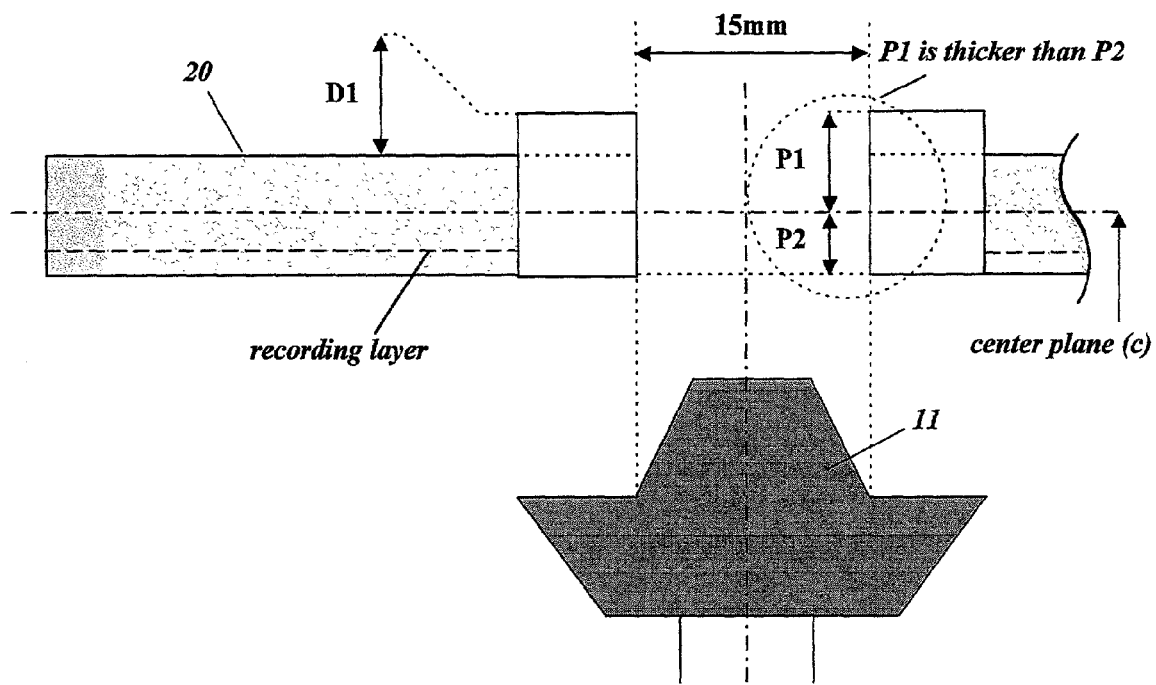
FIG. 6 is a sectional view of the first embodiment of, for example, a high-density disk structured according to the present invention.

FIG. 6 is a sectional view of the first preferred embodiment of a high-density disk structured according to the present invention. The embodiment of a high-density disk, for example, a HD-DVD according to the present invention has same dimension as a conventional HD-DVD depicted in FIG. 3, namely, 1.2 mm in thickness and 120 mm in diameter, a center hole of 15 mm diameter and a clamping zone (or clamping area) of 44 mm diameter encircling the center hole. In addition, when the present HD-DVD 20 of FIG. 6 is normally placed into a disk device, its recording layer, which contains pit patterns, would be approximately 0.1 mm from the objective lens of an optical pickup as mentioned before.

However, the present HD-DVD 20 in FIG. 6 has a clamping zone structured such that the thickness (P1 and P2) of each side, P1 and P2, are different, namely and preferably P1 is greater than P2. P1 and P2 are created by bisecting the clamping zone with an imaginary longitudinal center plane "c." In order for both sides to have different thicknesses, the opposite side of the recording side, which is the recording layer, protrudes above the disk's upper surface, indicated by D1 in FIG. 6. Because it is not necessary for the entire clamping zone to have a different thickness, the clamping zone may have partial regions that are protruding or raised with respect to the recording or reading area of the disk.

The height D1 preferably ranges from about 0.1 mm to 0.6 mm and guarantees a marginal gap between the present disk and the objective lens for preventing a collision between the objective lens of an optical pickup even though the objective lens moves upward to the maximum movable distance on the condition that the present high-density disk has been placed upside down. Alternatively, other suitable height D1 may also be used without deviating from the present invention.

Figure 7:
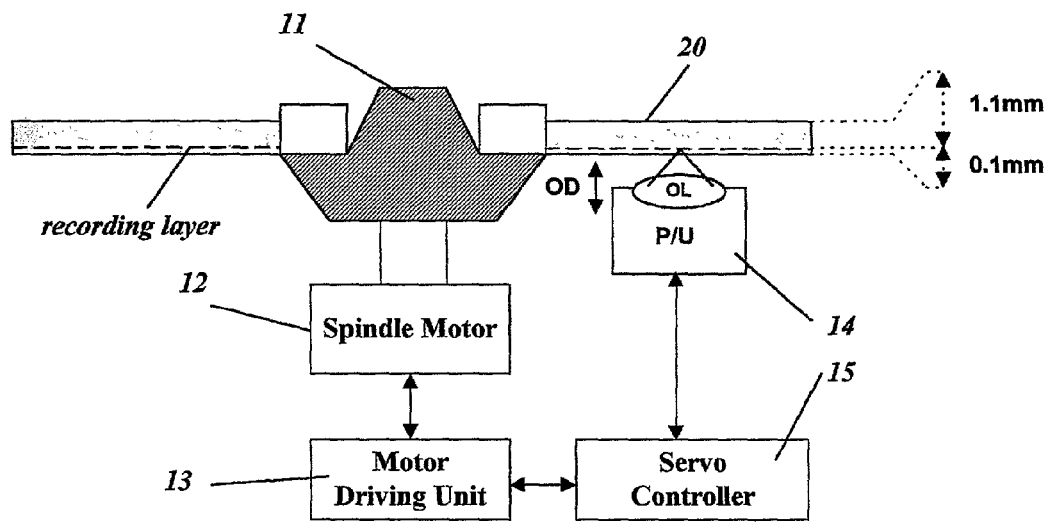
FIGS. 7 and 8 show normal placement and misplacement, respectively, of the first embodiment of a high-density disk structured according to the present invention.

If the disk 20 structured as above is placed normally on a spindle or turntable 11 equipped in a disk device as shown in FIG. 7, the non-protruding side of the clamping zone of the present disk 20 is in contact with the turntable 11. Consequently, the disk 20 is normally clamped the same as a conventional disk.

After successful clamping of the high-density disk 20, a conventional servo-controlling operation, characterized by the operation of the spindle motor 12, the motor driving unit 13 and the servo controller 15, is conducted to rotate the right-clamped disk 20 at a constant and high speed. Subsequently, a focusing-servo operation is conducted to focus a laser beam exactly onto a recording layer by moving the objective lens OL of the optical pickup 14 up and down within the operating distance OD. Once the laser beam is exactly focused, reproduction (or recording) of the high-density pit patterns begins.

Figure 8:
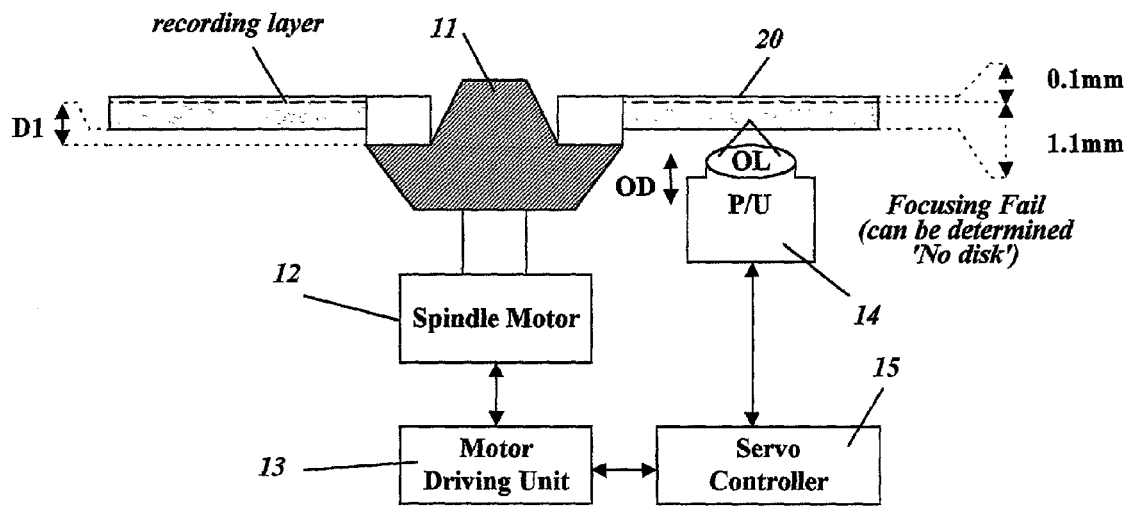

However, if the present disk 20 is placed upside down on the turntable 11 as shown in FIG. 8, the protruding side of the clamping zone of the present disk 20 is in contact with the turntable 11. Consequently, the surface of the disk 20 is raised by the height D1 over normal placement, which ranges from about 0.1 mm to 0.6 mm. In other words, the separation distance between the objective lens and the disk 20 has increased due to the added thickness of the clamping zone.

Therefore, although the objective lens OL of the optical pickup 14 moves up to the maximum distance to acquire the exact focus while the misplaced disk 20 is rotating at a high speed, the objective lens OL will not collide with the surface of the misplaced disk 20, due to the marginal gap D1 created by the protruding side of the clamping zone. Furthermore, because the recording layer, and the high-density pit patterns contained within, is also further apart from the objective lens OL than in normal placement, the focusing operation will fail. As a result, the misplacement of the disk would be judged as "no disk." Because a judgment of "no disk" ceases the focusing operation, a collision between the objective lens OL and the disk 20 is avoided.

Figure 9:
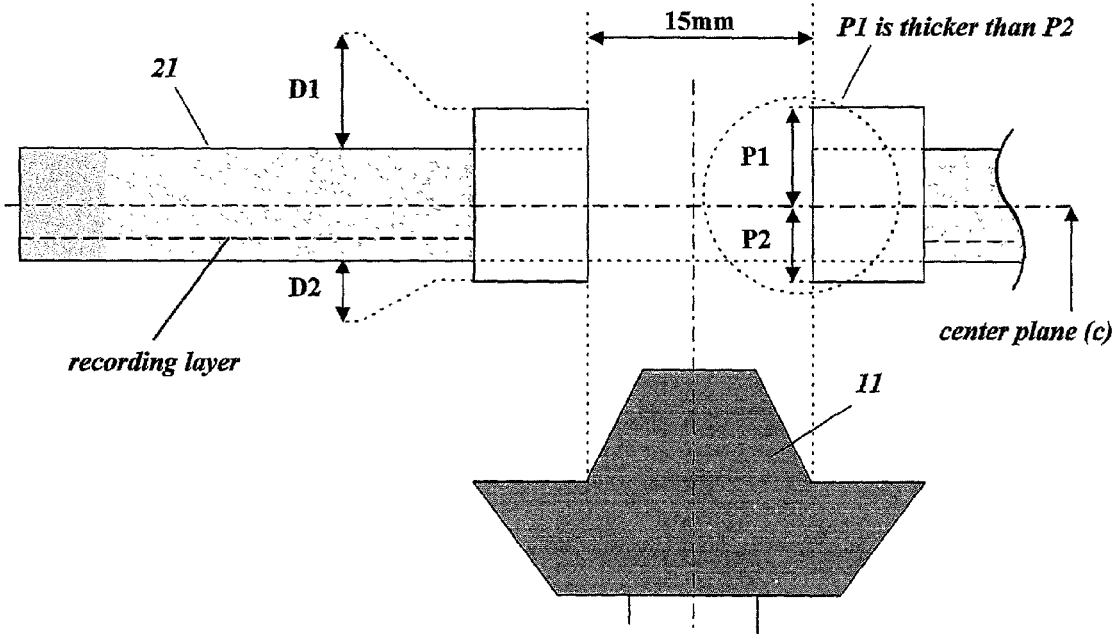
FIG. 9 is a sectional view of the second embodiment of a high-density disk structured according to the present invention.
Figure 10:
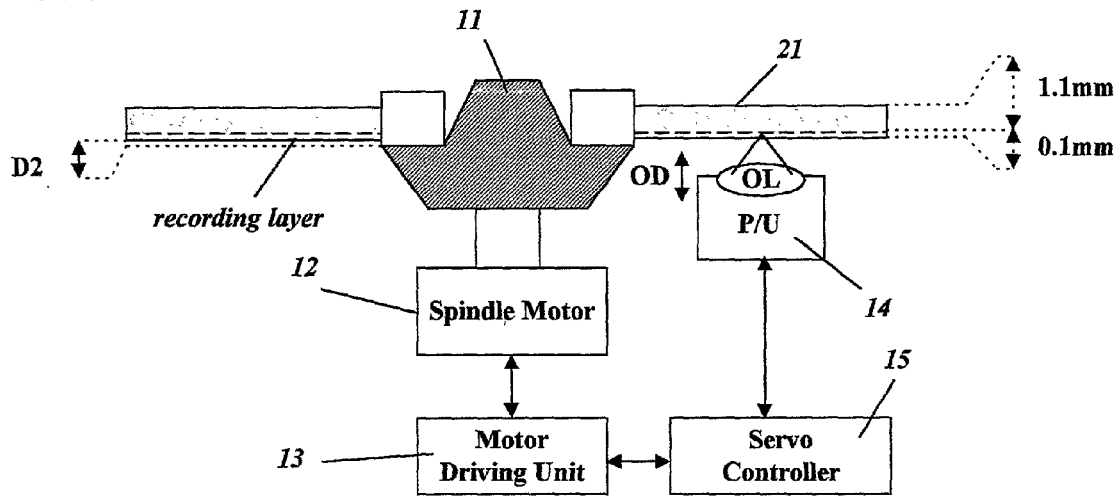
FIGS. 10 and 11 show normal placement and misplacement, respectively, of the second embodiment of a high-density disk structured according to the present invention.

FIG. 9 is a sectional view of the second preferred embodiment of a high-density disk structured according to the present invention. The second embodiment of a high-density disk 21 according to the present invention has a clamping zone structured such that the thickness of each side, P1 and P2, which are created by bisecting the clamping zone with an imaginary longitudinal center plane "c," are different. Namely, P1 is greater than P2, where both P1 and P2 are both greater than one-half of the whole thickness of the disk 21 as shown in FIG. 9. The side opposite to the recording side protrudes from disk surface a greater distance than of the recording side. As shown in FIG. 9, the height D1, which ranges approximately from 0.1 mm to 0.6 mm, is greater than D2, which is located on the recording side.

The protruding height D2 of the recording side is preferably determined to be within a range that ensures a successful focus of the pit patterns within the recording layer by the objective lens OL as it moves up and down within the operating distance OD on the condition that the disk 21 has been normally placed.

Therefore, if the high-density disk 21 structured as above is placed normally on the turntable 11, the recording layer of the disk 21 is further apart from the objective lens OL by the small protruding height D2 than that of a conventional disk. However, because the distance D2 is within a range ensuring successful focus as described above, it is possible to focus a light beam on the recording layer so that reproduction (or recording) of the high-density pit patterns can be conducted.

Figure 11:
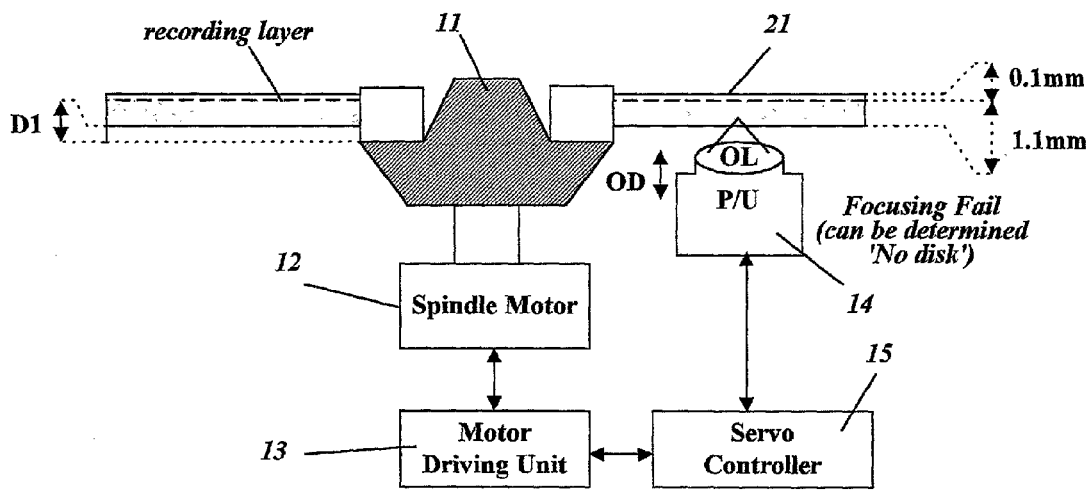

If the high-density disk 21 is placed upside down on the turntable 11 as shown in FIG. 11, the surface containing the protruding side of the clamping zone that measures in height D1 is situated higher by the same height D1, similar to the situation depicted in FIG. 8. Consequently, the objective lens OL of the optical pickup 14 can move up to the maximum distance to acquire an exact focus while the misplaced disk 21 is rotating at a high speed without colliding with the surface of the misplaced disk 21. Also, because the recording layer is further apart from the objective lens OL by the height D1, the focusing operation will fail, resulting in that the disk misplacement would be judged as "no disk." Because judgment of 'no disk' ceases all focusing operations, a collision between the objective lens OL and the disk 21 is avoided.

Figure 12:
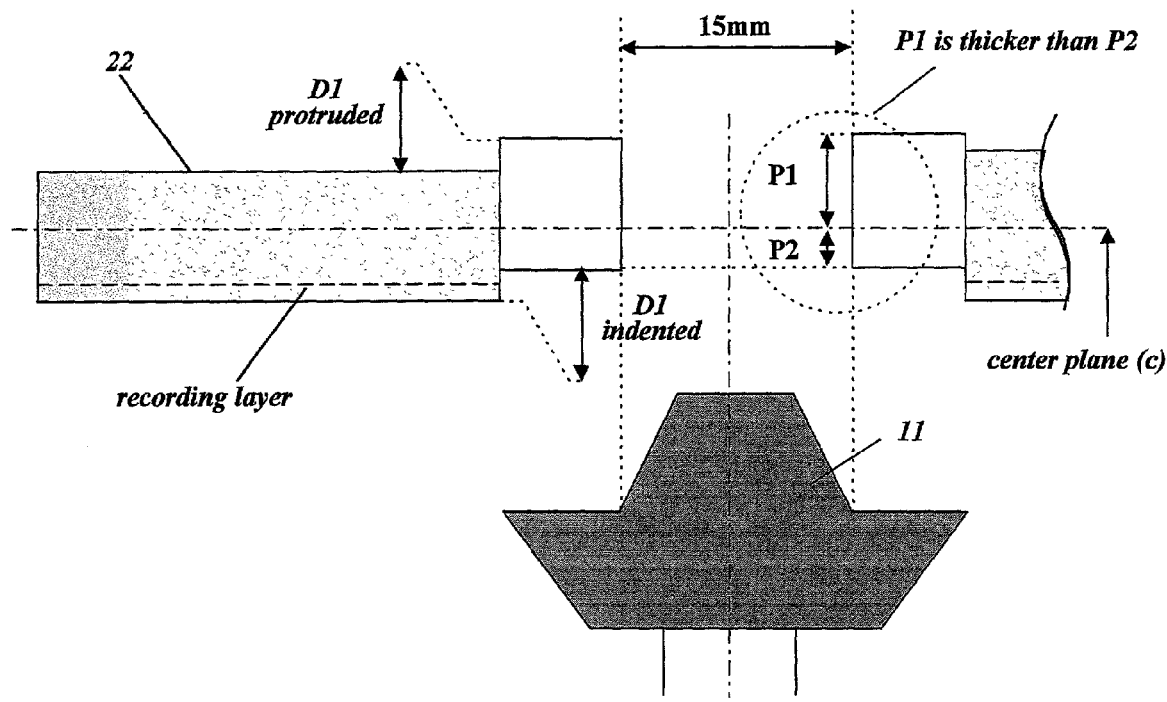
FIG. 12 is a sectional view of the third embodiment of a high-density disk structured according to the present invention.
Figure 13:
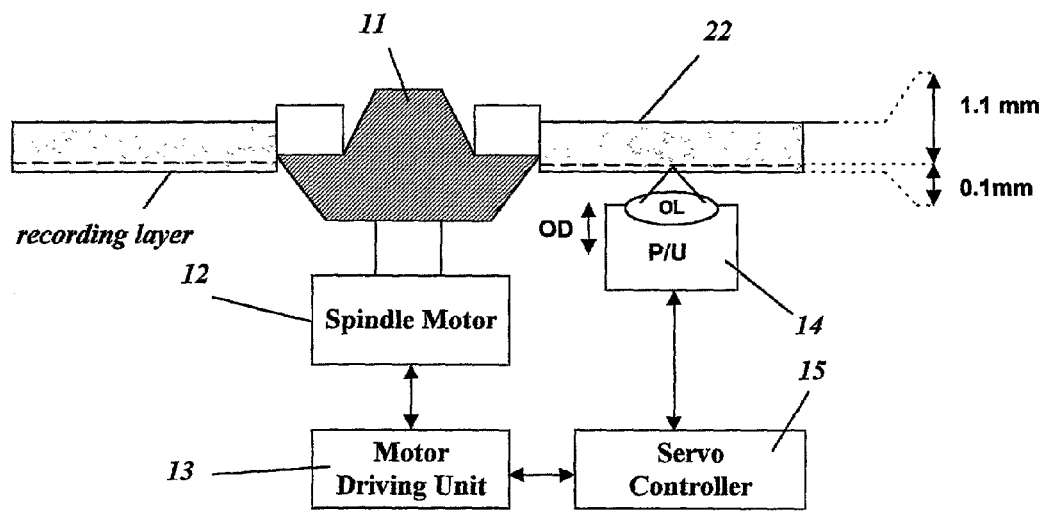
FIGS. 13 and 14 show normal placement and misplacement, respectively, of the third embodiment of a high-density disk structured according to the present invention.

FIG. 12 is a sectional view of the third preferred embodiment of a high-density disk structured according to the present invention. The third embodiment of a high-density disk 22 according to the present invention has a clamping zone structured such that the thickness of each side, P1 and P2, which are created by bisecting the high-density disk 22 with an imaginary longitudinal center plane "c." In this case, P1 is greater than P2 and P1 is thicker than one-half of the whole thickness of the disk 22 but P2 is thinner than one-half of the whole thickness of the disk 22. The side opposite to the recording side protrudes from disk surface by the height D1, which ranges from approximately 0.1 mm to 0.6 mm, whereas the clamping zone on the recording side is indented by a height less than D1.

Therefore, if the high-density disk 22 structured as above is placed normally on the turntable 11, the indented side of the clamping zone, which is in contact with a holder of the turntable 11, allows the recording layer of the disk 22 to be appropriately apart from the optical pickup 14. However, the distance between the recording layer and the objective lens OL for this embodiment is longer within the acceptable range for a conventional disk.

In this situation, an exact focus on the recording layer is acquired through moving the objective lens OL up and down within the operating distance OD, which can then result in the reproduction (or recording) of high-density pit patterns.

Figure 14:
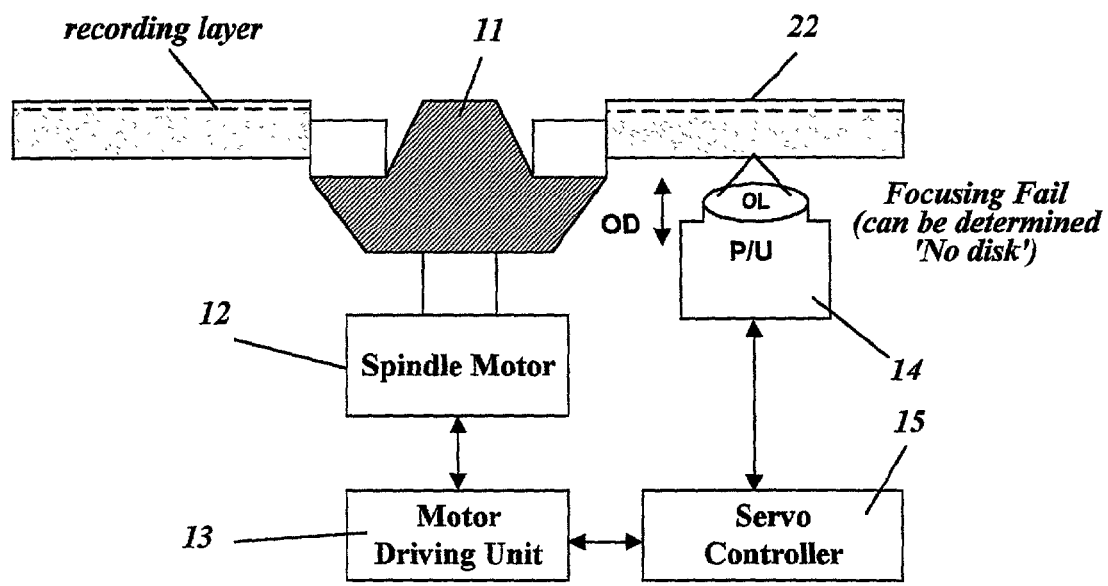

If the present disk 22 is placed upside down on the turntable 11 as shown in FIG. 14, the surface of the disk 22 is raised by a height D1, which ranges from 0.1 mm to 0.6 mm. Therefore, although the objective lens OL of the optical pickup 14 can move up to the maximum distance to acquire an exact focus on the recording layer, the objective lens OL will not collide with the surface of the misplaced disk 22. As described above, the misplacement would result in a reading of "no disk," which would cease the focusing operation and avoiding a collision between the objective lens OL and the disk 22.

In addition, the protrusion and/or indentation of the clamping zone may be shaped variously other than the aforementioned embodiments, for example, a clamping zone may be protruded or indented partially.

The invention may be applicable to a rewritable high-density disk as well as a read-only high-density disk without departing from the sprit or essential characteristics thereof. Alternatively, the present invention may also be applied to any other rewritable or read-only type disk medium. The present embodiments are therefore to be considered in all respects as illustrative and not restrictive, the scope of the invention being indicated by the appended claims rather than by the foregoing description and all changes which come within the meaning and range of equivalency of the claims are therefore intended to be embraced therein.

What is claimed is:

1. A recording medium for storing data comprising:
   first and second surfaces, a clamping area including first and second clamping area, a center hole for receiving a spindle therein; and
   a recording layer disposed in a lower portion with respect to a center plane of the first and second surfaces and being in closer proximity to the second surface, wherein
   the clamping area has a first clamping surface and a second clamping surface and at least a protruding portion on the first clamping surface so that the recording medium is raised from the spindle when the recording medium is inserted by placing the first clamping surface on the spindle,
   wherein the second surface is a normal entrance surface of a light beam.

2. The recording medium of claim 1, wherein the clamping area at the protruding portion has first and second thicknesses measured from a center plane of the recording medium, the first thickness measured in a direction extending from the center plane of the recording medium toward the first surface of the recording medium and the second thickness measured in a direction toward the second surface, wherein the first thickness is greater than the second thickness.

3. The recording medium of claim 2, wherein a difference between the first and the second thicknesses is approximately 0.1 mm to 0.6 mm.

4. The recording medium of claim 1, wherein the recording layer is located at about 0.1 mm from the second surface.

5. The recording medium of claim 1, wherein the second clamping surface is coplanar with the second surface.

6. A recording medium comprising:
   a first side having a surface;
   a second side having a surface;
   a recording layer disposed between the first side and the second side, and closely located at the second side;
   a second side clamping zone that is located concentrically within the second side and is level with the surface of the second side; and a first side clamping zone that is located concentrically within the first side and at least partially protrudes beyond the surface of the first side, wherein the surface of the second side is a normal entrance surface of a light beam.

7. The recording medium of claim 6, wherein the recording layer is coplanarly disposed between the first side and the second side.

8. The recording medium of claim 6, wherein the second side clamping zone is greater in thickness than the first side clamping zone.

9. The recording medium of claim 8, wherein the second side clamping zone is greater in thickness than the first side clamping zone by about 0.1 mm to 0.6 mm.

10. The recording medium of claim 6, wherein the recording layer is located at about 0.1 mm from the second surface.

11. A recording medium, comprising:
a clamping area;
an information area having a first surface and a second surface; and
a recording layer disposed closely in the second surface;
wherein a step protrudes at least partially from the first surface of the information area to a top surface of the clamping area,
wherein the second surface is a normal entrance surface of a light beam.

12. A recording medium, comprising:
a clamping area;
an information area having a first surface and a second surface; and
a recording layer disposed closely in the second surface;
wherein a step protrudes at least partially from the first surface of the information area to a top surface of the clamping area,
wherein the second surface is a normal entrance surface of a light beam,
wherein the recording layer is located at about 0.1 mm from the second surface.

13. The recording medium of claim 12, wherein a thickness from the top surface of the clamping area to the second surface of the information area is greater than a thickness from the first surface of the information area to the second surface of the information area.

14. The recording medium of claim 13, wherein the step between the top surface of the clamping area and the first surface of the information area has a thickness of more than 0.1 mm.

15. The recording medium of claim 13, wherein the step between the top surface of the clamping area and the first surface of the information area has a thickness of lower than 0.6 mm.

16. The recording medium of claim 13, wherein the step between the top surface of the clamping area and the first surface of the information area has a thickness of a range 0.1 mm<t<0.6 mm.

17. A recording medium, comprising:
a clamping area;
an information area having a first surface and a second surface; and
a recording layer disposed closely in the second surface;
wherein a step protrudes at least partially from the first surface of the information area to a top surface of the clamping area,
wherein the step between the top surface of the clamping area and the first surface of the information area has a thickness so as not to collide with an objective lens of an optical pickup even though the objective lens moves upward to the maximum movable distance to focus the recording layer when the top surface of the clamping area is placed to bottom.

18. A recording medium, comprising:
a clamping area;
an information area having first surface and second surface, wherein the second surface is a normal entrance surface of a light beam; and
a recording layer disposed closely in the second surface,
wherein a step from top surface of the clamping area to the first surface of the information area is formed, thereby to have a different thickness between a thickness from the top surface of the clamping area to the second surface of the information area and a thickness from the first surface of the information area to the second surface of the information area.

19. The recording medium of claim 18, wherein the recording layer is located at about 0.1 mm from the second surface.

20. The recording medium of claim 18, wherein the thickness from the top surface of the clamping area to the second surface of the information area is greater than the thickness from the first surface of the information area to the second surface of the information area.

21. The recording medium of claim 20, wherein the step between the top surface of the clamping area and the first surface of the information area has a thickness of more than 0.1 mm.

22. The recording medium of claim 20, wherein the step between the top surface of the clamping area and the first surface of the information area has a thickness of lower than 0.6 mm.

23. The recording medium of claim 20, wherein the step between the top surface of the clamping area and the first surface of the information area has a thickness of a range 0.1 mm<t<0.6 mm.

24. The recording medium of claim 18, wherein the step between the top surface of the clamping area and the first surface of the information area has a thickness so as not to collide with an objective lens of optical pickup even thought the objective lens moves upward to the maximum movable distance to focus the recording layer when the top surface of the clamping area is placed to bottom.

25. A recording medium, comprising:
a clamping area;
an information area having first surface and second surface; and
a recording layer disposed closely in the second surface,
wherein a step from top surface of the clamping area to the first surface of the information area is formed, thereby to have a different thickness between a thickness from the top surface of the clamping area to the second surface of the information area and a thickness from the first surface of the information area to the second surface of the information area, wherein the step between the top surface of the clamping area and the first surface of the information area has a thickness so as not to collide with an objective lens of optical pickup even thought the objective lens moves upward to the maximum movable distance to focus the recording layer when the top surface of the clamping area is placed to bottom.

26. The recording medium of claim 25, the second surface is a normal entrance surface of light beam 27. The recording medium of claim 26, wherein the recording layer is located at about 0.1 mm from the second surface.

28. A recording medium, comprising:

a clamping area;

an information area having first surface and second surface, the second surface being a normal entrance surface of light beam; and a recording layer disposed closely in the second surface, wherein the recording layer is located at about 0.1 mm from the second surface, wherein a step from top surface of the clamping area to the first surface of the information area is formed, thereby to have a different thickness between a thickness from the top surface of the clamping area to the second surface of the information area and a thickness from the first surface of the information area to the second surface of the information area, wherein the step between the top surface of the clamping area and the first surface of the information area has a thickness so as not to collide with an objective lens of optical pickup even thought the objective lens moves upward to the maximum movable distance to focus the recording layer when the top surface of the clamping area is placed to bottom.

* * * * *